No. 782,822. PATENTED FEB. 21, 1905.
W. H. BRYAN & J. M. GOERMAN.
NUT LOCK FOR RAILWAY RAIL SPLICES.
APPLICATION FILED DEC. 17, 1904.
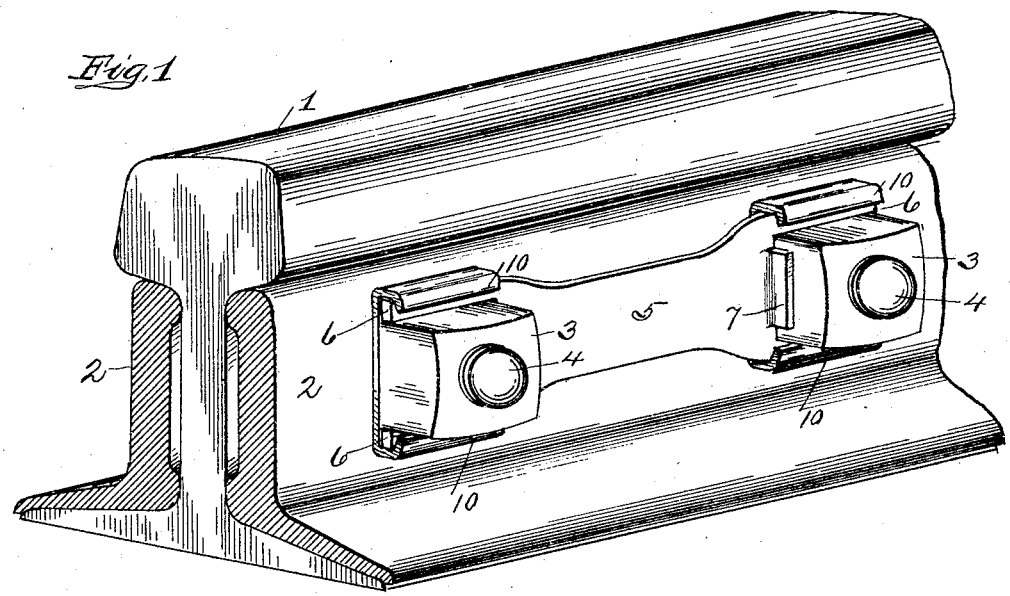
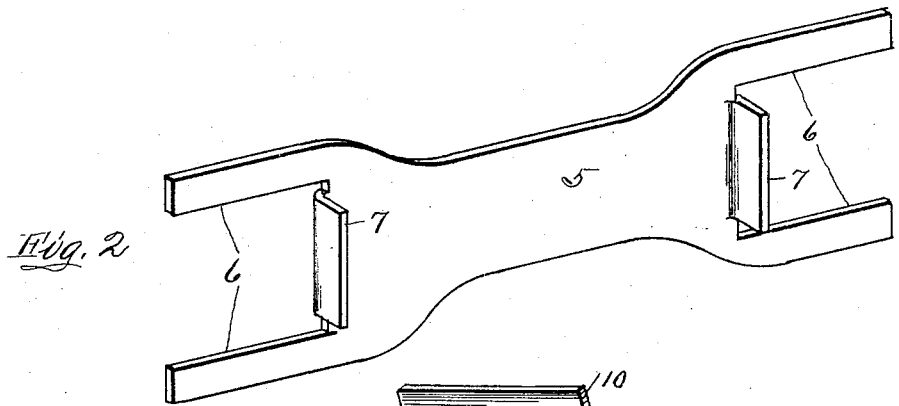
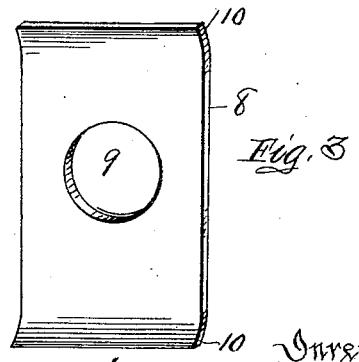
WITNESSES:
O. A. Hensel.
J. A. Akron.
INVENTORS.
William H. Bryan, and
John M. Goerman,
by M. E. Harrison.
Attorney.

No. 782,822.

Patented February 21, 1905.

UNITED STATES PATENT OFFICE.

WILLIAM H. BRYAN, OF FORD CITY, AND JOHN M. GOERMAN, OF McCAIN, PENNSYLVANIA.

NUT-LOCK FOR RAILWAY-RAIL SPLICES.

SPECIFICATION forming part of Letters Patent No. 782,822, dated February 21, 1905.

Application filed December 17, 1904. Serial No. 237,207.

*To all whom it may concern:*

Be it known that we, WILLIAM H. BRYAN, residing at Ford City, and JOHN M. GOERMAN, residing at McCain, in the county of Armstrong and State of Pennsylvania, citizens of the United States, have invented certain new and useful Improvements in Nut-Locks for Railway-Rail Splices; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an improved nut-lock for railway-rail splices; and it consists in the certain details of construction and combination of parts, as will be fully described hereinafter.

In the accompanying drawings, Figure 1 is a perspective view of a portion of a railway-rail and splice having our improved nut-lock arranged in position thereon, the same being constructed and arranged in accordance with our invention. Fig. 2 is a similar view of the lock-bar detached from the splice. Fig. 3 is a perspective view of the washer used for holding the lock-bar in position.

To put our invention into practice, and thereby providing a means for locking the nuts to their bolts, and adapt the same for railway use upon the splices or rail connections, said connections consisting of the flanged splice-bars 2, attached in position by bolts 4, fitted with nuts 3, in a manner common in the art, we provide a lock-bar formed from pressed steel or other suitable material, said bar consisting of a plate 5, having an opening 6 at either end, of a diameter equal to that of the nuts 3, upon which it is placed, and the said bar 5 formed with integral portions 7, bent at right angles to the body and adapted to bear against the vertical sides of the two nuts 3. Arranged at the rear of the lock-bar and the nuts 3 are rectangular washers 8, having each a central aperture 9 to receive the end of the bolt 4, and slightly outwardly curved ends 10 to permit the insertion of a suitable tool between said washers and the splice-bar 2 to facilitate the bending of the same over the lock-bar, as will be seen by reference to Fig. 1 of the drawings.

To assemble the parts, the splice-bars 2 are arranged in position on the ends of the rails 1 and the bolts inserted in the usual manner. The washers 8 are now placed in position, one to each bolt, and the nuts 3 screwed tightly to their place. The lock-bar 5 is now arranged between a pair of nuts, the flanged portions 7 bearing against the vertical sides and the portions 6 spanning the nuts. By means of a suitable tool the top and bottom 10 of each washer is bent over the lock-bar and downward and upward toward the nuts, clenching and holding the said lock-bar in position, thereby rendering the nuts immovable.

It is obvious that this nut-lock as above described may be used for locking nuts to their bolts other than railway-splices and that various slight modifications and changes may be made in the details of construction without departing from the spirit of the invention. Therefore we do not wish to confine ourselves to the exact construction shown and described, but wish to claim all such modifications as would come properly within the general scope of the invention.

Having thus described our invention, what we claim, and desire to secure by Letters Patent, is—

The herein-described nut-lock for railway-rail splices, comprising the plate 5, having openings 6 at either end adapted to span the nuts 3, the integral flanges 7 formed at the ends of said openings to bear against the vertical sides of said nuts, washers interposed between said bar and the splice-bar 2, said washers consisting of a rectangular plate 8, having a central aperture 9, and outwardly-curved ends 10, said ends being bent about the lock-bar to hold the same in position, all arranged and combined for service, substantially as and for the purpose described.

In testimony whereof we affix our signatures in presence of two witnesses.

WILLIAM H. BRYAN.
JOHN M. GOERMAN.

Witnesses:
  ORR BUFFINGTON,
  BLANCHE BROWN.